United States Patent [19]

Amagasa

[11] Patent Number: 5,998,949
[45] Date of Patent: Dec. 7, 1999

[54] WIPER APPARATUS

[75] Inventor: Toshiyuki Amagasa, Ota, Japan

[73] Assignee: Mitsuba Corporation, Gunma, Japan

[21] Appl. No.: 09/105,936

[22] Filed: Jun. 26, 1998

[30] Foreign Application Priority Data

Jul. 2, 1997 [JP] Japan .................................. 9-177121

[51] Int. Cl.⁶ .................................................. H02P 1/00
[52] U.S. Cl. ........................ 318/280; 318/443; 318/444; 318/DIG. 2; 318/266
[58] Field of Search .................................. 318/443, 444, 318/266, DIG. 2, 280

[56] References Cited

U.S. PATENT DOCUMENTS

| | | | |
|---|---|---|---|
| 3,796,936 | 3/1974 | Kearns ...................................... | 318/443 |
| 4,336,482 | 6/1982 | Goertler et al. ......................... | 318/443 |
| 4,585,980 | 4/1986 | Gille et al. .............................. | 318/444 |
| 4,670,695 | 6/1987 | Licata et al. ............................ | 318/443 |
| 4,896,084 | 1/1990 | Naue et al. .............................. | 318/280 |
| 5,568,026 | 10/1996 | Welch ..................................... | 318/443 |
| 5,684,011 | 11/1997 | Corey et al. ............................ | 318/444 |

*Primary Examiner*—Robert E. Nappi
*Assistant Examiner*—Rita Leykin
*Attorney, Agent, or Firm*—McCormick, Paulding & Huber

[57] ABSTRACT

A direct drive type rear wiper in which normal and reverse rotation of a motor causes reciprocating wiping operation of a wiper blade of a vehicle such as an automobile, comprising a motor 1 which rotates in normal and reverse directions, a worm wheel 2 which rotates being interlocked with the motor 1, a relay plate 3 which rotates being interlocked with the worm wheel 2, four contacts S1–S4 provided facing the relay plate 3, and a control circuit 4 for switching direction of electric current for the motor 1. In particular, when the motor 1 is to be stopped at a turning position in reciprocating wiping operation of the wiper blade, electric braking is made to act directly on the motor 1 according to contacting condition between the relay plate 3 and the first and second contacts S1, S2.

10 Claims, 13 Drawing Sheets

Fig. 2

| SW | IN | | | OUT | |
|---|---|---|---|---|---|
| | S1 | S2 | RL1 COM | RL1 | RL2 |
| L (ON) | L | L | L | ON | OFF |
| L (ON) | L | L | H | ON | OFF |
| L (ON) | L | H | L | × | × |
| L (ON) | L | H | H | × | × |
| L (ON) | H | L | L | ON | OFF |
| L (ON) | H | L | H | ON | OFF |
| L (ON) | H | H | L | OFF | OFF |
| L (ON) | H | H | H | OFF | OFF |
| H (OFF) | L | L | L | OFF | OFF |
| H (OFF) | L | L | H | ON | OFF |
| H (OFF) | L | H | L | × | × |
| H (OFF) | L | H | H | × | × |
| H (OFF) | H | L | L | OFF | ON |
| H (OFF) | H | L | H | ON | OFF |
| H (OFF) | H | H | L | OFF | ON |
| H (OFF) | H | H | H | OFF | OFF |

|  | T6 | T7 |
|---|---|---|
| Blade position | | |
| Contact position & State of relay contacts | | |
| SW | ON | |
|  | OFF | |
| S1 | H | |
|  | L | |
| S2 | H | |
|  | L | |
| RL1COM | H | |
|  | L | |
| Turnover time 1 | ON | |
|  | OFF | |
| Turnover time 2 | ON | |
|  | OFF | |
| RL1 | ON | |
|  | OFF | |
| RL2 | ON | |
|  | OFF | |
| Rotational direction | N | |
|  | R | |

| | T13 | T14 | T15 | T16 |
|---|---|---|---|---|
| Blade position | | | | |
| Contact position & State of relay contacts | | | | |
| SW | ON / OFF | | | |
| S1 | H / L | | | |
| S2 | H / L | | | |
| RL1COM | H / L | | | |
| Turnover time 1 | ON / OFF | | | |
| Turnover time 2 | ON / OFF | | | |
| RL1 | ON / OFF | | | |
| RL2 | ON / OFF | | | |
| Rotational direction | N / R | | | |

Fig. 10

| | T26 | T27 | T28 | T29 |
|---|---|---|---|---|
| Blade position | | | | |
| Contact position & State of relay contacts | | Rl. plate | Rl. plate | Rl. plate |
| SW ON/OFF | | | | |
| S 1 H/L | | | | |
| S 2 H/L | | | | |
| RL1COM H/L | | | | |
| Turnover time 1 ON/OFF | | | | |
| Turnover time 2 ON/OFF | | | | |
| R L 1 ON/OFF | | | | |
| R L 2 ON/OFF | | | | |
| Rotational direction N/R | | | | |

WIPER APPARATUS

BACKGROUND OF THE INVENTION

1. Field of the Invention

The present invention relates to a wiper apparatus for making a wiper blade of a vehicle or the like perform reciprocating wiping operation by normal and reverse rotation of a motor, and in particular to a technique effectively applied to a wiper apparatus suitable for control of a rise-up wiper of a direct drive system.

2. Related Art Statement

For example, among techniques studied by the inventor, there exists a link-type rear wiper for a vehicle, in which a rack-and-pinion mechanism or link mechanism interlocked with a wiper blade is driven by using a worm wheel interlocked with normal and reverse rotation of a motor. This link-type is classified into an outside link-type in which these mechanism are arranged outside the motor, and an inside link-type in which these mechanism are arranged integrally with a reduction gear. Further, there has been used a direct drive system in which a relay plate is driven being interlocked with rotation of a worm wheel, and a wiper blade is made to perform reciprocating wiping operation according to relative position between this relay plate and contacts.

Among these techniques, the direct drive system has many advantages in making a wiper apparatus smaller and lighter, and in installation in narrow space, and, in particular, suitably used for a rear wiper etc. In the rear wiper, there has been used a rise-up type in which, when a wiper blade is stopped, it is further driven from a turning position to a storing position so as not to be obstruction for opening a rear glass hatch.

As a rise-up-wiper of this direct drive system, it is possible to consider a following technique. Namely, in such structure that a worm wheel is rotated being interlocked with rotation of a motor and a boss interlocked with the rotation of the worm wheel makes a relay plate rotate, a wiper blade performs reciprocating wiping operation by normal and reverse rotation of the motor. In that case, after detecting signal change from the relay plate of the motor, a relay within a controller connected to this relay plate is switched so that electric braking is applied to the motor.

As a rise-up wiper of such a direct drive system, may be referred to a technique described in Japanese Un-examined Patent Laid-Open No. 3-67754, for example. This technique may be briefly described as follows. Namely, there is provided a relay plate interlocked with rotation of a motor which can normally and reversely rotate and the relay plate has switching positions of storing, lower turning, and upper turning. Based on these positions of storing, lower turning, and upper turning, rotational direction of the motor can be switched.

In such a rise-up wiper of the direct drive system, there arise a delay of time between detection of the switching position and starting of braking. Accordingly, there exists such a problem that the turning position tends to be changed owing to variation in load by glass surface on which the wiper blade performs reciprocating wiping operation.

Further, when the relay is switched based on the change of the signal from the relay plate, noise may be added to input signal at the turning positions. In that case, the relay, which is operated based on this input signal, is caused to chatter and the motor may continue rotating in the normal direction so that the wiper blade abuts against a pillar.

Further, in the technique described in the above-described Japanese Un-examined Patent Laid-Open No. 3-67754, the rotational direction of the motor is switched directly based on a position of the relay plate. Accordingly, there may arise such a problem that, when a wiper switch is turned OFF immediately after being turned ON, a contact contacting with the relay plate is not switched, so that the wiper blade is stopped on the spot.

Further, when the rotational direction of the motor is switched, twice voltage as much as ordinary one, i.e. power-supply voltage to grounding voltage and the grounding voltage to the power-supply voltage, are directly applied to the contact itself which contacts with the relay plate. And the motor is switched at once from the normal direction to the reverse direction of rotation, and from reverse direction to the normal direction. Accordingly, unnecessarily large load may be applied to the motor.

Thus, an object of the present invention is to provide a wiper apparatus in which switching of contacts and a motor does not cause unnecessary large load, and electric braking is performed directly by relay plate interlocked with driving of the motor, without using a procedure for relay switching. By this, it is possible to remove the delay until starting braking and to increase accuracy of the turning positions, as well as to prevent malfunction of the wiper blade.

The above-described and other objects and new features of the present invention will be made obvious from the following description and the attached drawings.

SUMMARY OF THE INVENTION

Outlines of representative inventions out of ones disclosed herein will be briefly described as follows.

Namely, the present invention is applied to a direct drive type wiper apparatus, in which normal and reverse rotations of a motor cause reciprocating wiping operation of a wiper blade. The wiper apparatus of the present invention, comprises:

a motor which rotates in the normal and reverse directions;

a switching means for switching said motor between the normal and reverse rotations;

a relay plate and a plurality of contacts, contacting positions of which are changed being interlocked with the normal and reverse rotations of the motor, so as to detect turning position in reciprocating wiping operation of the wiper blade;

the relay plate having a plurality of conductive material portions connected to different voltages respectively; and one of the conductive material portions, which contacts with a normal-reverse rotation contact out of that plurality of contacts, being switched at each turning position of the wiper blade so as to change polarity of the normal-reverse rotation contact, and thereby making electric braking act on the motor, so that rotating direction of the motor is switched.

In particular, to provide a rise-up function to a normal-reverse rotating direct drive type apparatus which can prevent the above-described malfunction owing to noise, the wiping apparatus is provided with a means for switching a wiping angle, which is switched by turning ON/OFF of the wiper switch, and arranged so as to enlarge an operating angle of the wiper blade more than the ordinary, depending on a switched state of this means.

Further, to make rise-up distance of the rise-up function variable, at least one conductive material portion is provided integrally with an extended conductive material portion with a given angle which extends in a circumferential direction passing an end portion for switching polarity.

Further, to hold ON state of the switching means even if the wiper switch is turned OFF immediately after being turned ON, and, thus, to prevent incorrect stopping, the wiper apparatus is provided with a-means for holding a rotational direction of the motor, depending on a state of the switching means.

Further, to provide variation in an interlocking relation between the relay plate-contacts and a boss fixed to the worm wheel, the contacts are rotated being interlocked with the normal and reverse rotation of the motor, while the relay plate is fixed.

Further, to make it easy to cope with, for example, conditional change in a relation between input signals and output signals, by changing a program, the wiper apparatus is provided with a microcomputer constituting a control circuit which receives, as inputs, position detecting signals based on contacting condition of the relay plate and the contacts, and the like, which outputs output signals for controlling the switching means so as to rotate the motor in the normal or reverse direction, and which performs operation control of electric braking and stopping by forming a closed circuit.

The above-described and other objects, novel feature of the present invention will become apparent more fully from the description of the following specification in conjunction with the accompanying drawings.

BRIEF DESCRIPTION OF THE DRAWINGS

FIG. 2 is an explanatory view showing input and output signals of a control circuit in the wiper apparatus of Embodiment 1 of the present invention;

FIG. 5 is a timing chart and explanatory views following FIG. 4, in Embodiment 1 of the present invention;

FIG. 6 is a timing chart showing storing operation of the wiper apparatus and explanatory views showing states of the wiper blade, contacts, and relay plates at each timing, in Embodiment 1 of the present invention;

FIG. 7 is a timing chart and explanatory views following FIG. 6, in Embodiment 1 of the present invention;

FIG. 10 is a timing chart and explanatory views following FIG. 9, in Embodiment 1 of the present invention;

DESCRIPTION OF THE PREFERRED EMBODIMENT

Figure 1:
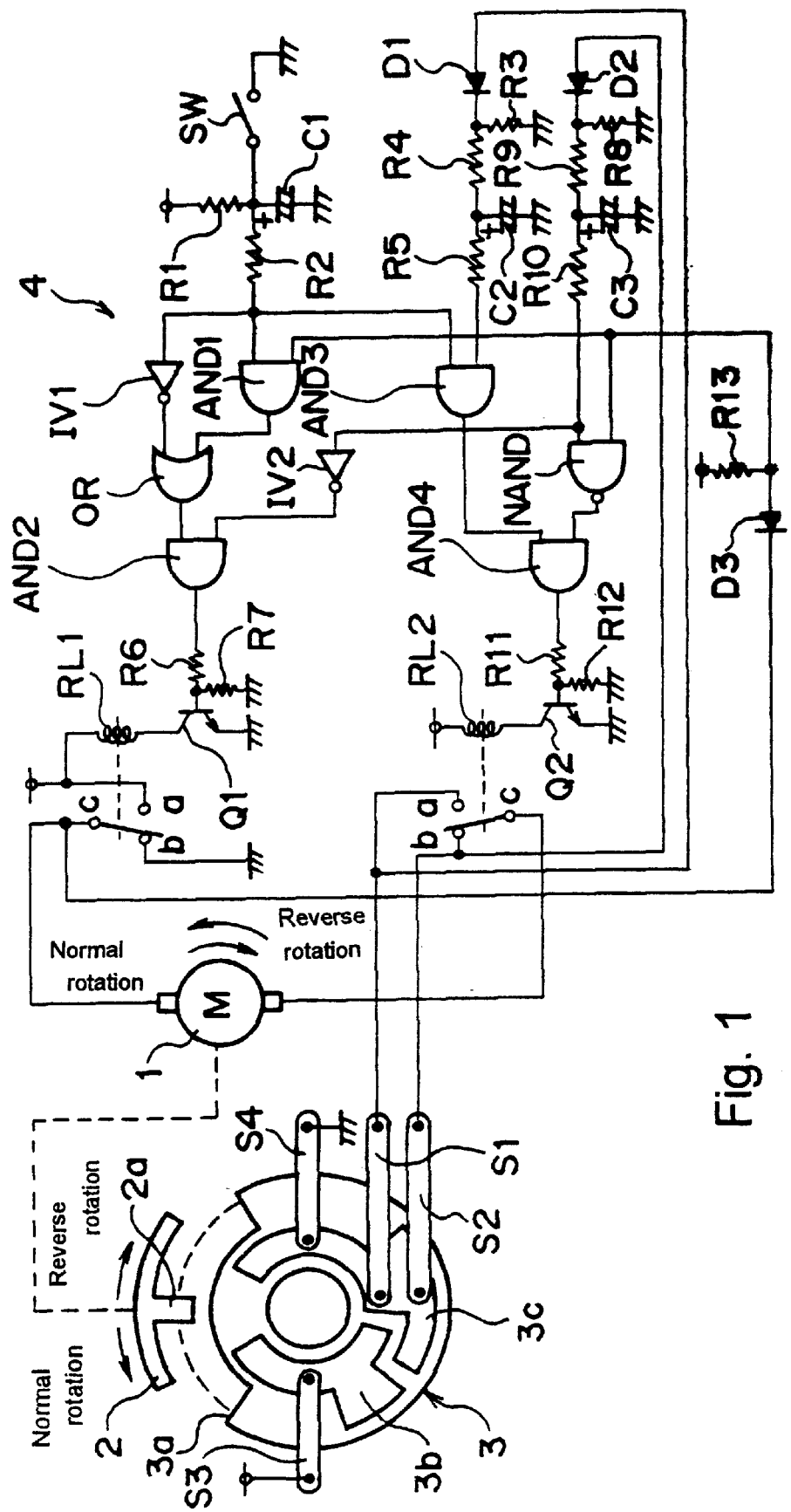
FIG. 1 is a circuit diagram showing a main part of a wiper apparatus as Embodiment 1 of the present invention.

Embodiments of the present invention will be described in detail based on the drawings. Here, same reference numerals refer to same components throughout the drawings for explaining the embodiments, to omit repeated explanations.

Embodiment 1:

FIG. 1 is a circuit diagram showing a main part of a wiper apparatus as Embodiment 1 of the present invention. FIG. 2 is an explanatory view showing input and output signals of a control circuit in the wiper apparatus of the present Embodiment 1. And FIGS. 3–10 are timing charts showing various operations of the wiper apparatus and explanatory views showing states of a wiper blade, contacts, and a relay plate for each timing.

First, referring to FIG. 1, configuration of the main part of the present Embodiment 1 will be described.

The wiper apparatus of the present Embodiment 1 is used in a rear wiper of the direct drive system in which a wiper blade of a vehicle such as an automobile performs reciprocating wiping operation by normal and reverse rotation of a motor. This wiper apparatus comprises a motor 1 rotating normally and reversely according to switching of electric current direction, a worm wheel 2 rotating being interlocked with the motor 1, a relay plate 3 rotating being interlocked with the worm wheel 2, four contacts S1–S4 provided relatively in this relay plate 3, and a control circuit 4 for switching current direction of motor 1 according to contacting state between the relay plate 3 and contacts S1–S4.

The relay plate 3 is formed generally in a disk shape made of insulating material, and its outer peripheral portion has a cut-out portion 3a to which a boss 2a fixed to the worm wheel 2 is moved. The cut-out portion 3a is formed in an arc (of about 140 degrees) with a given width within a range of reciprocating wiping operation of the wiper blade. This generally-disk-shaped relay plate 3 is concentrically provided with two conductive material portions 3b, 3c having respective given shapes. The first conductive material portion 3b is electrically connected to power-supply voltage and the second conductive material portion 3c to grounding voltage.

The first and second conductive material portions 3b, 3c are formed in respective given shapes, for example, as shown in FIG. 1, each in combination of an arc of a given width in an inner circumference and an arc of a given width in an outer circumference, and the arc portion in the inner circumference of the first conductive material portion 3b and the arc portion in the outer circumference of the second material portion 3c are related to each other in a range of about 20 degrees. The first conductive material portion 3b is so formed that a part of the arc portion (about 140 degrees) in the inner circumference is connected with the arc portion (about 30 degrees) in the outer circumference. The second conductive material portion 3c is so formed that the arc portion (about 140 degrees) in the inner circumference is connected with a part of the arc portion (about 60 degrees) in the outer circumference. Of course, shapes of the first and second conductive material 3b, 3c are not limited to these.

Four contacts S1–S4 comprises conductive contacts respectively. In particular, the first contact S1 is provided for rise-up, and the second contact S2 is for changing between the normal and reverse rotations. Each of the first and second contacts S1, S2 contacts; at its one end, with the first conductive material portion 3b or the second conductive material portion 3c provided in the relay plate 3, and contacts, at the other end, with the control circuit 4. One end of the third contact S3 always contacts with the first conductive material portion 3b, and the other end is connected with the power-supply voltage. One end of the fourth contact S4 always contacts with the second conductive material portion 3c, and the other end is connected with the grounding voltage.

In particular, the first contact S1 is provided for rise-up, as a means for switching a wiping angle, being arranged so as to enlarge the operating angle of the wiper blade to the storing position, depending on contacting condition between the first and second conductive material portions 3b, 3c of the relay plate 3 and the first and second contacts S1, S2. Further, each of the first and second conductive material portions 3b, 3c is provided, integrally and at a given angle, with an extended conductive material portion which extends in the circumferential direction passing an end portion for switching polarity.

The control circuit 4 comprises a wiper switch SW, four AND gates AND1–AND4, a NAND gate NAND, an OR gate OR, two inverters IV1, IV2, two transistors Q1, Q2, two relays RL1, RL2, three diodes D1–D3, a plurality of resistors R1–R13, condenser C1–C3, and the like. The control circuit 4 receives, as its inputs, a state signal of the wiper switch SW, position-detecting signals for storing, lower turning, and upper turning respectively, based on contacting conditions between the relay plate 3 and the contacts S1, S2, and COM signal of the relay RL1. Depending on these inputs, the control circuit 4 switches current direction by the relays RL1, RL2 as switching means so as to make the motor rotate in the normal or reverse direction. Further, the control circuit 4 can perform operation control such as electric braking or stopping, by making a closed circuit. This COM signal of the relay RL1 becomes a means for holding rotational direction of the motor.

One input terminal of the AND gate AND1 is connected to the power-supply voltage through the resistors R1, R2, and the condenser C1, as well as connected to the wiper switch SW, so that the power-supply voltage is applied to the AND gate AND1 and an ON/OFF signal of the wiper switch SW is inputted to the AND gate AND1. The other input terminal of the AND gate AND1 is connected to the power-supply voltage through the resistor R13, as well as to a common contact "c" of the relay RL1 through the diode D3, so that COM signal of the relay RL1 is inputted to that input terminal. An output terminal of this AND gate AND1 is connected to one input terminal of the OR gate OR.

One input terminal of the OR gate is connected to one input terminal of the AND gate AND1 through the inverter IV1, so that ON/OFF signal of the wiper switch is inputted being inverted by the inverter IV1. To the other input terminal of the OR gate, is inputted the output signal of the AND gate AND1. An output terminal of this OR gate is connected to one input terminal of the AND gate AND2.

To one input terminal of the AND gate AND2, is inputted the output signal of the OR gate OR. The other input terminal of the AND gate AND2 is connected to the second contact S2 through the inverter IV2, the resistors R8–R10, the condenser C3, and the diode D2, so that the position-detecting signal from the second contact S2 is inputted, being inverted by the inverter IV2. An output terminal of this AND gate AND2 is connected to a base of the transistor Q1 through the resistors R6, R7, so as to perform base control of the transistor Q1. To a collector of this transistor Q1, is connected the power-supply voltage via a coil of the relay RL1, so that the coil of the relay RL1 is controlled to be in an excited state or non-excited state. Based on the state of that coil, connection between the common contact "c" and open contacts a or b of the relay RL1 is switched. To the common contact "c" of this relay RL1, is connected one terminal of the motor 1. Thus, by relative state of contact switching of this relay RL1 and below-described relay RL2, current direction of the motor 1 is switched.

One input terminal of the AND gate AND3 is connected to one input terminal of the AND gate AND1, so that ON/OFF signal of the wiper switch SW is inputted. The other input terminal of the AND gate AND3 is connected to the first contact S1 through the resistors R3–R5, the condenser C2, and the diode D1, so that the position-detecting signal from the first contact S1 is inputted. An output terminal of this AND gate AND3 is connected to one input terminal of the AND gate AND4.

One input terminal of the NAND gate NAND is connected to the second contact S2 through the resistors R8–R10, the condenser C3, the diode D2, so that the position-detecting signal from the second contact S2 is inputted. The other input terminal of the NAND gate is connected to the other input terminal of the AND gate AND1, so that COM signal of the relay RL1 is inputted. An output terminal of this NAND gate is connected to the other input terminal of the AND gate AND4.

To one input terminal of the AND gate AND4, is inputted output signal of the AND gate AND3, and to other input terminal is inputted, the output signal of the NAND gate NAND. An output terminal of this AND gate AND4 is connected to a base of the transistor Q2 through the resistors R11, R12, so as to perform base control of the transistor Q2. A collector of this transistor Q2 is connected to the power-supply voltage through a coil of the relay RL2, so as to control the coil of the relay RL2 to be in an excited state or non-excited state. Based on the state of that coil, connection between the common contact "c" and open contacts a or b of the relay RL2 is switched. To the common contact "c" of this relay RL2, is connected the other terminal of the motor 1. Thus, by relative state of contact switching of this relay RL2 and the above-described relay RL1, current direction of the motor 1 is switched.

The logic section of the control circuit 4 is not limited to the above-described configuration comprising the AND gates AND1–AND4, the NAND gate NAND, the OR gate OR, the inverters IV1, IV2. And, there can be used any logical composition which gives such relation between input signals and output signals as shown in FIG. 2. Thus, the present invention can be applied to a control circuit having such other logical composition.

In thus-constructed control circuit 4 of the wiper apparatus, such voltage levels of input signals IN and output signals OUT as shown in FIG. 2, for example, are obtained. Namely, as input signals, a state signal of the wiper switch SW, position-detecting signals based on contacting conditions between the relay plate 3 and the contacts S1, S2, and COM signal of the relay RL1 are inputted. And, the relays RL1, RL2 are controlled by output signals accompanying these input signals.

For example, in the case that the wiper switch SW is ON and a voltage level is low "L", and both the first and second contacts S1, S2 are in contact with the second conductive material portion 3c of the relay plate 3 and the voltage level is "L", the relay RL1 is excited to be ON and the relay RL2 is non-excited to be OFF, whichever COM signal of the relay RL1 is "L" or "H" (a high voltage level).

In the case that the wiper switch SW is ON and the voltage level is "L", the first contact S1 is in contact with the first conductive material portion 3b of the relay plate 3 so that the voltage level is "H", and the second contact S2 is in contact with the second conductive material portion 3c so that the voltage level is "L", the relay RL1 is excited to be ON and the relay RL2 is to be non-excited to be OFF, whichever COM signal of the relay RL1 is "L" or "H".

In the case that the wiper switch SW is ON and the voltage level is "L", and both the first and second contacts S1, S2 are in contact with the first conductive material portion 3b of the relay plate 3 so that the voltage stage is be "H", both the relays RL1, RL2 are non-excited to be OFF, whichever COM signal of the relay RL1 is "L" or "H".

In the case that the wiper switch SW is OFF and the voltage level is "H", and both the first and second contacts S1, S2 are in contact with the second conductive material portion 3c of the relay plate 3 so that the voltage level is "L", then, when COM signal of the relay RL1 is "L", both the relays RL1, RL2 are non-excited to be OFF. On the other hand, when COM signal of the relay RL1 is "H", the relay RL1 is excited to be ON and the relay RL2 is non-excited to be OFF.

In the case that the relay RL1 is non-excited to be OFF and the relay RL2 is excited to be ON, when the first contact S1 is in contact with the second conductive material portion 3c of the relay plate 3 so that the voltage level is "L", then a current-carrying circuit of the motor 1 becomes a closed circuit and electric braking is operated so that the motor 1 becomes in a stopped state. In that case, the condenser C2 starts discharging through the resistor R5. When it is confirmed that, on the side of the resistor R5, an input voltage level of the AND gate AND3 becomes "L", then, the coil of the relay RL2 becomes non-excited, and the relay RL2 is turned OFF.

In the case that the wiper switch SW is OFF and the voltage level is "H", the first contact S1 is in contact with the first conductive material portion 3b of the relay plate 3 so that the voltage level is "H", and the second contact S2 is in contact with the second conductive material portion 3c so that the voltage level is "L", then, when COM signal of the relay RL1 is "L", the relay RL1 is non-excited to be OFF and the relay RL2 is excited to be ON. On the other hand, when COM signal of the relay RL1 is "H", the relay RL1 is excited to be ON and the relay RL2 is non-excited to be OFF, reversely to the former case.

In the case that the wiper switch SW is OFF and the voltage level is "H", and both the first and second contacts S1, S2 are in contact with the first conductive material portion 3b of the relay plate 3 so that the voltage level is "H", then, when COM signal of the relay RL1 is "L", the relay RL1 is non-excited to be OFF and the relay RL2 is excited to be ON. On the other hand, when COM signal of the relay RL1 is "H", both the relay RL1, RL2 are non-excited to be OFF.

In the relation of FIG. 2 between input signals IN and output signals OUT, there does not exist a state that the wiper switch SW is "L" or "H", the first contact S1 is "L", and the second contact S2 is "H", as contacting condition between the first and second contacts S1, S2 and the first and second conductive material portions 3b, 3c. This depends on the shapes of the first and second conductive material portions 3b, 3c provided in the relay plate 3, and those shapes are characteristic of the present embodiment.

Next, as to the operation of the present Embodiment 1, there will be described, successively, intermittent operation of the wiper blade when the wiper switch SW is turned ON, storing operation of the wiper blade when the wiper switch SW is turned OFF, and operation of the wiper blade when the wiper switch is turned OFF immediately after being turned ON.

Figure 3:
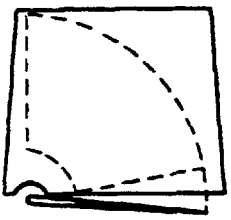
FIG. 3 is a timing chart showing intermittent operation of the wiper apparatus and explanatory views showing states of a wiper blade, contacts, and a relay plate for each timing, in Embodiment 1 of the present invention.
Figure 4:
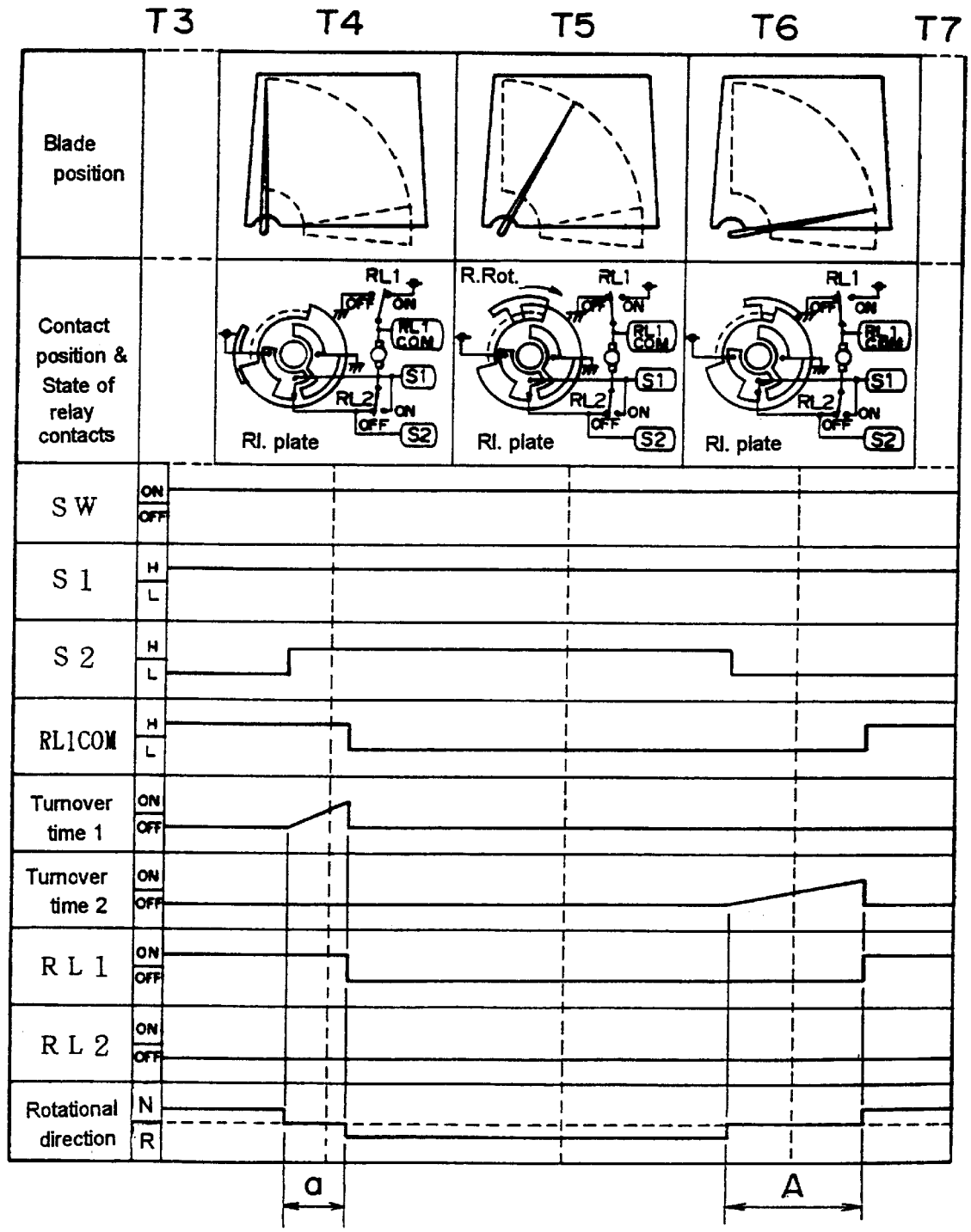
FIG. 4 is a timing chart and explanatory views following FIG. 3, in Embodiment 1 of the present invention.

First, there will be described timing T1–T7 of the intermittent operation of the wiper blade when the wiper switch is turned ON as a basic operation, referring to FIGS. 3–5.
T1: In this initial condition at the operation of the wiper blade, the wiper switch SW is OFF, and both the first and second contacts S1, S2 are in contact with the second conductive material portion 3c to be "L". Accordingly, to the logic section of the control circuit 4, are inputted signal "H" from the wiper switch SW in OFF state and signals "L"s from the first and second contacts S1, S2, and the output signal of the logic section becomes "L". By this, both the coils of the relays RL1, RL2 are non-excited, and the relays RL1 and RL2 remain OFF and the common contact "c" is connected to the closed contact "b".

In that case, the control circuit 4 for the motor 1 constitutes a closed circuit which connects the grounding voltage to the grounding voltage through the closed contact "b" of the RL1, the common contact "c" of the RL1, one terminal of the motor 1, the other terminal of the motor 1, the common contact "c" of the RL2, the closed contact "b" of the RL2, the second contact S2, the second conductive material portion 3c, and the fourth contact S4. Thus, electric braking acts on the motor 1 and the motor 1 is in a stopped state. At that time, the wiper blade interlocked with the motor 1 is stopped in the storing position.
T2: When the wiper switch SW is turned ON while the wiper blade is in this storing position, signal "L" by turning ON of the wiper switch SW, and signals "L"s from the first and second contacts S1, S2 are inputted into the logic section of the control circuit 4. Although the output signal of the AND gate AND4 remains "L", the output signal of the AND gate AND2 is changed from "L" to "H". By this, only the coil of the relay RL1 is excited, the relay RL1 becomes ON, and the connection of the common contact "c" is switched to the open contact "a".

At that time, in the control circuit 4 for the motor 1, the power-supply voltage is connected to the grounding voltage through the open contact "a" of RL1, the common contact "c" of RL1, one terminal of the motor 1, the other terminal of the motor 1, the common contact "c" of RL2, the closed contact "b" of RL2, the second contact S2, the second conductive material portion 3c, and the fourth contact S4,. Thus, the current flows in the direction of the normal rotation, and the motor 1 rotates in the normal direction. In that case, the wiper blade performs wiping operation from the storing position toward the upper turning position, passing the lower turning position.
T3: Further, in this wiping operation of the wiper blade toward the upper turning position, when the rotation of the motor 1 is continued in the normal direction, the boss 2a fixed to the worm wheel 2 moves exceeding the range of the cut-out portion 3a so as to rotate the relay plate 3. Accordingly, connection of the first contact S1 is switched from the second conductive material portion 3c to the first conductive material portion 3b, and the first contact S1 is changed from "L" to "H".

At that time, while signal "L" from the wiper switch SW in ON state, and signal "H" from the switched first contact S1 are inputted into the logic section of the control circuit 4, the output signal of the AND gate AND4 remains "L". Accordingly, the coil of the relay RL2 becomes non-excited, and the relay RL2 holds the OFF state. Thus, rotation of the motor 1 is not affected, and the motor 1 holds the rotating state to continue rotating in the normal direction. In that case, the wiper blade continues the wiping operation toward the upper turning position.
T4: When the wiping operation of the wiper blade is continued toward the upper turning position, the relay plate 3 is further rotated being driven by the boss 2a fixed to the worm wheel 2, and the wiper blade arrives at the upper turning position. In that case, the connection of the second contact S2 is switched from the second conductive material portion 3c to the first conductive material portion 3b, and the second contact S2 is changed from "L" to "H".

In that case, the control circuit 4 for the motor 1 constitutes a closed circuit which connects the power-supply voltage to the power-supply voltage through the open contact "a" of RL1, the common contact "c" of RL1, one terminal of the motor 1, the other terminal of the motor 1, the common contact "c" of RL2, the open contact "b" of RL2, the second contact S2, the first conductive material plate 3b, and the third contact S3. Thus, electric braking acts on the motor 1, and the motor 1 is in a stopped state. At that time, the wiper blade interlocked with the motor 1 is stopped at the upper turning position.

Stopping time at this upper turning position, i.e. time period "a" from the switching of the second contact S2 to "H" to switching of the relay RL1 to OFF, is set by a turnover timer 1. Only for this time period "a", the control circuit 4 for the motor 1 constitutes the closed circuit, and, when the normal rotation is switched to the reverse rotation, the motor 1 is in the stopped state under the action of the electric braking. This time period "a" by the turnover timer 1 is set with input of the signal of the second contact S2.

T5: Successively, after the time period "a" of the stopped state of the motor 1, signal "L" by the wiper switch SW in ON state, and signal "H" by the switched second contact S2 are inputted to the logic section of the control circuit 4. As a result, the output signal of the AND gate AND2 is changed from "H" to "L", so that the coil of the relay RL1 becomes non-excited and the relay RL1 is switched to OFF.

At that time, the control circuit 4 for the motor 1 connects the power-supply voltage to the grounding voltage through the third contact S3, the first conductive material portion 3b, the second contact S2, the closed contact "b" of RL2, the common contact "c" of RL2, one terminal of the motor 1, the other terminal of the motor 1, the common contact "c" of RL1, and the closed contact "b" of RL1. Accordingly, current flows in the direction of the reverse rotation, and the motor 1 rotates in the reverse direction. In that case, the wiper blade is turned from the upper turning position to perform wiping operation toward the lower turning position.

T6: When the wiping operation of the wiper blade is continued toward the lower turning position, the relay plate 3 is rotated in the reverse direction being driven by the boss 2a fixed to the worm wheel 2, and the wiper blade arrives at the lower turning position. In that case, the connection of the second contact S2 is switched from the first conductive material portion 3b to the second conductive material portion 3c, and the second contact S2 is changed from "H" to "L".

At that time, the control circuit 4 for the motor 1 constitutes a closed circuit which connects the grounding voltage to the grounding contact through the fourth contact S4, the second conductive material portion 3c, the second contact S2, the closed contact "b" of RL2, the common contact "c" of RL2, one terminal of the motor 1, the other terminal of the motor 1, the common contact "c" of RL1, and the closed contact "b" of RL1. As a result, the motor 1 becomes in a stopped state under the action of electric braking. In that case, the wiper blade interlocked with the motor 1 is stopped at the lower turning position.

Stopping time at this lower turning position, i.e. intermittent time period "A" from the switching of the second contact S2 to "L" to switching of the relay RL1 to ON, is set by a turnover timer 2. Only in this intermittent time period "A", the control circuit 4 of the motor 1 constitutes a closed circuit. Thus, when the reverse rotation is switched to the normal rotation, electric braking acts on the motor 1 to bring it to a stopped state. This intermittent time period "A" is set in the turnover timer 2 by inputting the signal of the second contact S2.

T7: Then, when the intermittent time period "A" of the stopped state of the motor 1 has passed, signal "L" caused by ON operation of the wiper switch and signal "L" from the switched second contact S2 are inputted into the logic section of the control circuit 4. Then, the output signal of the AND gate AND2 is changed from "L" to "H", and the coil of the relay RL1 is put in an excited state so as to switch the relay RL1 to ON.

At that time, the control circuit 4 of the motor 1 connects the power-supply voltage to the grounding voltage through the open contact "a" of RL1, the common contact "c" of RL1, one terminal of the motor 1, the other terminal of the motor 1, the common contact "c" of RL2, the closed contact "b" of RL2, the second contact S2, the second conductive material portion 3c, the fourth contact S4. Accordingly, current flows in the direction of the normal rotation, and the motor 1 rotates in the normal direction. In that case, the wiper blade performs wiping operation from the lower turning position toward the upper turning position.

As described above, after the rotational direction of the motor 1 is switched by turning the wiper switch SW to ON at the timing T1, the wiping operation is performed from the storing position of the wiper blade to the upper turning-position, in accordance with the timings T1–T3, and then the wiping operation is performed from the upper turning position to the lower turning position in accordance with the timings T4–T6. On and after the timing T7, these operations are repeated so that the wiping operation between the lower turning position and the upper turning position is performed as the intermittent operation.

In this intermittent operation of the wiper blade, the turnover timer 2 sets the intermittent time period "A" at the lower turning position longer than the time period "a" at the upper turning position. This intermittent time period "A" sets length of the stopped state in the intermittent operation. Thus, in the case that this intermittent time period "A" at the lower turning position is set to be equal to the time period "a" at the upper turning position, the intermittent operation can be switched to continuous operation, and reciprocating wiping operation between the lower turning position and the upper turning position can be performed.

In particular, at the upper turning position and the lower turning position in this intermittent operation, electric braking can be directly applied to the motor 1 depending on the contacting condition between the relay plate 3 and the first and second contact S1, S2. Thus, there is no effect of malfunction of the relays RL1, RL2 owing, for example, to noise carried by turnover signal. Further, switching from the normal rotation to the reverse rotation and vice versa can be performed via a stopped state by electric braking.

Figure 6:
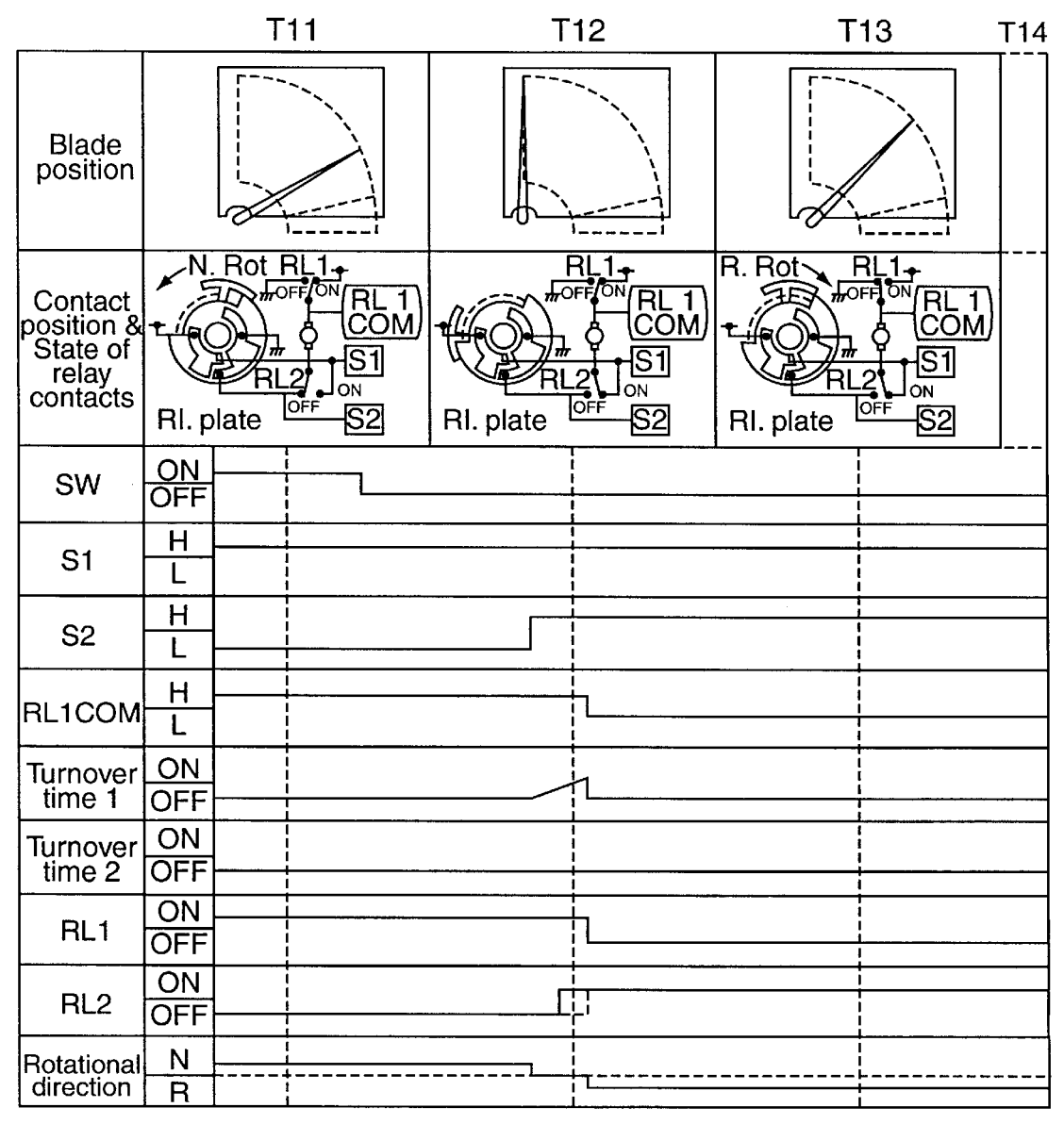

Next, referring to FIGS. 6 and 7, will be described timing T11–T16 of the storing operation of the wiper blade when the wiper switch is turned OFF as a basic operation.

T11: For example, in the course of the above-described timing T2 of the intermittent operation, i.e. in the course of rotation in the normal direction of the motor 1 in wiping operation of the wiper blade from the lower turning position to the upper turning position, the wiper switch SW is turned OFF for storing the wiper blade, the timing T2 being caused by the state that the wiper switch SW is ON, the first contact S1 is "H", the second contact S2 is "L", the relay RL1 is ON, and the relay RL2 is OFF.

In that case, while signal "H" by OFF state of the wiper switch SW and signal "H" from the first contact S1 are inputted into the logic section of the control circuit 4, the output signal of the AND gate AND4 remains "L". Accordingly, the coil of the relay RL2 becomes non-excited, and the relay RL2 holds the OFF state. This does not affect the rotation, and the motor 1 holds the rotating state to continue rotating in the normal direction. In that case, the wiper blade continues the wiping operation toward the upper turning position.

T12: When the wiping operation of the wiper blade is continued toward the upper turning position, the relay plate 3 is rotated being driven by the boss 2a fixed to the worm wheel 2, and the wiper blade arrives at the upper turning position. In that case, the connection of the second contact S2 is switched from the second conductive material portion 3c to the first conductive material portion 3b, and the second contact S2 is changed from "L" to "H".

At that time, the control circuit 4 for the motor 1 constitutes a closed circuit which connects the power-supply voltage to the power-supply voltage through the open contact "a" of RL1, the common contact "c" of RL1, one terminal of the motor 1, the other terminal of the motor 1, the common contact "c" of RL2, the open contact "a" of RL2, the first contact S1, the first conductive material portion 3b, and the third contact S3. Thus, the motor 1 becomes in a stopped state, under the action of electric braking. In that case, the wiper blade interlocked with the motor 1 is stopped at the upper turning position.

In this stopped state at the upper turning position, in the case of the storing operation, the coil of the relay RL2 is excited by a leading edge of transition from "L" to "H" of the second contact S2 (turnover timer 1), and the relay RL2 is switched to ON. This switching of the relay RL2 to ON can be performed by COM signal of the relay RL1. In that case, the timing is as shown in FIG. 6 indicated by the one dot chain line.

T13: Successively, after the time period of the stopped state of the motor 1, signal "L" by the wiper switch SW in OFF state, and signal "H" from the switched second contact S2 are inputted into the logic section of the control circuit 4. The output signal of the AND gate AND 2 is changed from "H" to "L", the coil of the relay RL1 is non-excited, and the relay RL1 is switched to OFF.

At that time, the control circuit 4 for the motor 1 connects the power-supply voltage to the grounding voltage through the third contact S3, the first conductive material portion 3b, the first contact S1, the open contact "a" of RL2, the common contact "c" of RL2, one terminal of the motor 1, the other terminal of the motor 1, the common contact "c" of RL1, and the closed contact "b". Accordingly, current flows in the direction of the reverse rotation, and the motor 1 rotates in the reverse direction. In that case, the wiper blade is turned from the upper turning position and performs wiping operation toward the lower turning position.

T14: When the wiping operation of the wiper blade is continued toward the lower turning position, the relay plate 3 is rotated in the reverse direction, being driven by the boss 2a fixed to the worm wheel 2. When the wiper blade passes the lower turning position, the connection of the second contact S2 is switched from the first conductive material portion 3b to the second conductive material portion 3c, and the second contact S2 is changed from "H" to "L".

At that time, while signal "H" by the wiper switch SW in OFF state and signal "L" from the switched second contact S2 are inputted into the logic section of the control circuit 4, the output signal of the AND gate AND2 remains "L". Accordingly, the coil of the relay RL1 becomes non-excited, and the relay RL1 holds the OFF state. Since this does not affects the rotation, the motor 1 holds the rotating state to continue in the reverse direction. In that case, the wiper blade continues the wiping operation from the lower turning position toward the storing position.

T15: When the wiping operation of the wiper blade is continued toward the storing position, the relay plate 3 is rotated further in the reverse direction, being driven by the boss 2a fixed to the worm wheel 2. When the wiper blade arrives at the storing position, the connection of the first contact S1 is switched from the first conductive material portion 3b to the second conductive material portion 3c, and the first contact S1 is changed from "H" to "L".

At that time, the control circuit 4 for the motor 1 constitutes a closed circuit which connects the grounding voltage to the grounding voltage through the fourth contact S4, the second conductive material portion 3c, the first contact S1, the open contact "a" of the relay RL2, the common contact "c" of the relay RL2, one terminal of the motor 1, the other terminal of the motor 1, the common contact "c" of the relay RL1, and the closed contact "b" of the relay RL1. Thus, the motor 1 becomes in a stopped state under the action of electric braking. In that case, the wiper blade interlocked with the motor 1 is stopped at the storing position.

T16: Finally, the coil of the relay RL2 becomes non-excited, and the relay RL2 is switched to OFF. The control circuit 4 for the motor 1 constitutes a closed circuit which connects the grounding voltage to the grounding voltage through the fourth contact S4, the second conductive material portion 3c, the second contact S2, the closed contact "b" of the relay RL2, the common contact "c" of the relay RL2, one terminal of the motor 1, the other terminal of the motor 1, the common contact "c" of the relay RL1, and the closed contact "b" of the relay RL1. This completes the storing operation of the wiper blade by turning OFF of the wiper switch SW.

Figure 8:
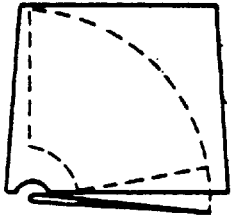
FIG. 8 is a timing chart showing operation when a wiper switch of the wiper apparatus is turned OFF immediately after being turned ON, and explanatory views showing states of the wiper blade, contacts, and relay plate at each timing.
Figure 9:
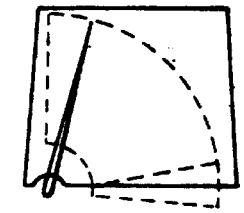
FIG. 9 is a timing chart and explanatory views following FIG. 8, in Embodiment 1 of the present invention.

Next, referring to FIGS. 8–10, there will be described timing T21–T29 of the operation of the wiper blade when the wiper switch SW is turned OFF immediately after being turned ON. This operation can be considered as a combination of the above-described intermittent operation and storing operation, and, accordingly, detailed description will be omitted.

T21: This timing is same as the above-described timing T1 in the intermittent operation. Namely, the wiper switch SW is OFF, the first contact S1 is "L", the second contact S2 is "L", the relay RL1 is OFF, and the relay RL2 is OFF, and thereby, the control circuit 4 for the motor 1 constitutes the closed circuit. At that time, motor 1 is in a stopped state under electric braking. And, in that case, the wiper blade interlocked with the motor 1 is stopped at the storing position.

T22: This timing is same as the above-described timing T2 in the intermittent operation. Namely, when the wiper switch SW is turned ON while the wiper blade is in the storing position, the output signal of the AND gate AND2 of the control circuit 4 is changed from "L" to "H". At that time, only the coil of the relay RL1 is excited, and the relay RL1 is switched to ON. By this, in the control circuit 4 for the motor 1, current flows in the direction of the normal rotation. In that case, the wiper blade performs wiping operation from the storing position toward the upper turning position, passing the lower turning position.

T23: This timing is same as the above-described timing T11. Namely, when the wiper switch SW is turned OFF immediately after being turned ON, then, although signal "H" by the wiper switch SW in OFF state is inputted into the logic section of the control circuit 4, the output signal of the AND gate AND4 remains "L", so that the relay RL2 holds the OFF state. Accordingly, the motor 1 holds the rotating state, and continues to rotate in the normal direction. In that case, the wiper blade continues the wiping operation toward the upper turning position.

T24: When the wiping operation of the wiper blade continues in T23 toward the upper turning position and the normal rotation of the motor 1 continues, the relay plate 3 is rotated, and the first contact S1 is changed from "L" to "H". In that case, although "H" signal of the changed first contact S1 is inputted into the logic section of the control circuit 4, the output signal of the AND gate AND4 remains "L". Accordingly, the coil of the relay RL2 holds OFF. Then, the motor 1 holds the rotating state to continue rotating in the normal direction, and the wiper blade continues the wiping operation until the upper turning position.

T25–T29: These are same as the timing T12–T16, and detailed description is omitted here.

As described above, even if the wiper switch SW is turned OFF immediately after being turned ON, the contacts S1, S2 contacting with the relay plate 3 are switched reliably. Until the second contact S2 is changed from "L" to "H", the relay RL1 holds ON state, and the motor 1 can continue rotating.

Thus, according to the wiper apparatus of the present Embodiment 1, when the motor 1 is to be stopped at the turning positions of the upper turning and lower turning, electric braking acts on the motor 1 depending on the contacting condition between the relay plate 3 and the first and second contacts S1, S2. By this, braking can be started without delay, and accuracy of the turning positions can be improved.

Further, even if the relays RL1, RL2 behave incorrectly owing to chattering of the turnover signal caused by noise etc., it results only in a stopped state, and normal or reverse rotation is continued at a turning position, so that the wiper blade does not collide against a pillar.

Further, a rotation state of the motor 1 is held by COM signal of the relay RL1 by itself. Accordingly, even when the wiper switch SW is turned OFF in the start-up, immediately after being turned ON, the rotation of the motor 1 can be continued. Thus, the wiper blade is prevented from stopping within the range of the wiping operation, and is reliably moved to the storing position.

Further, at a turning position of the wiper blade, the normal rotation is switched to the reverse rotation or vice versa, after electric braking once attains a stopped state. Accordingly, voltage within a given range can be applied to the first and second contacts S1, S2 themselves connected to the relay plate 3, and a load within a given range can be applied to the motor 1, so that the motor 1 and the wiper blade can be operated in a stable manner.

Figure 11:
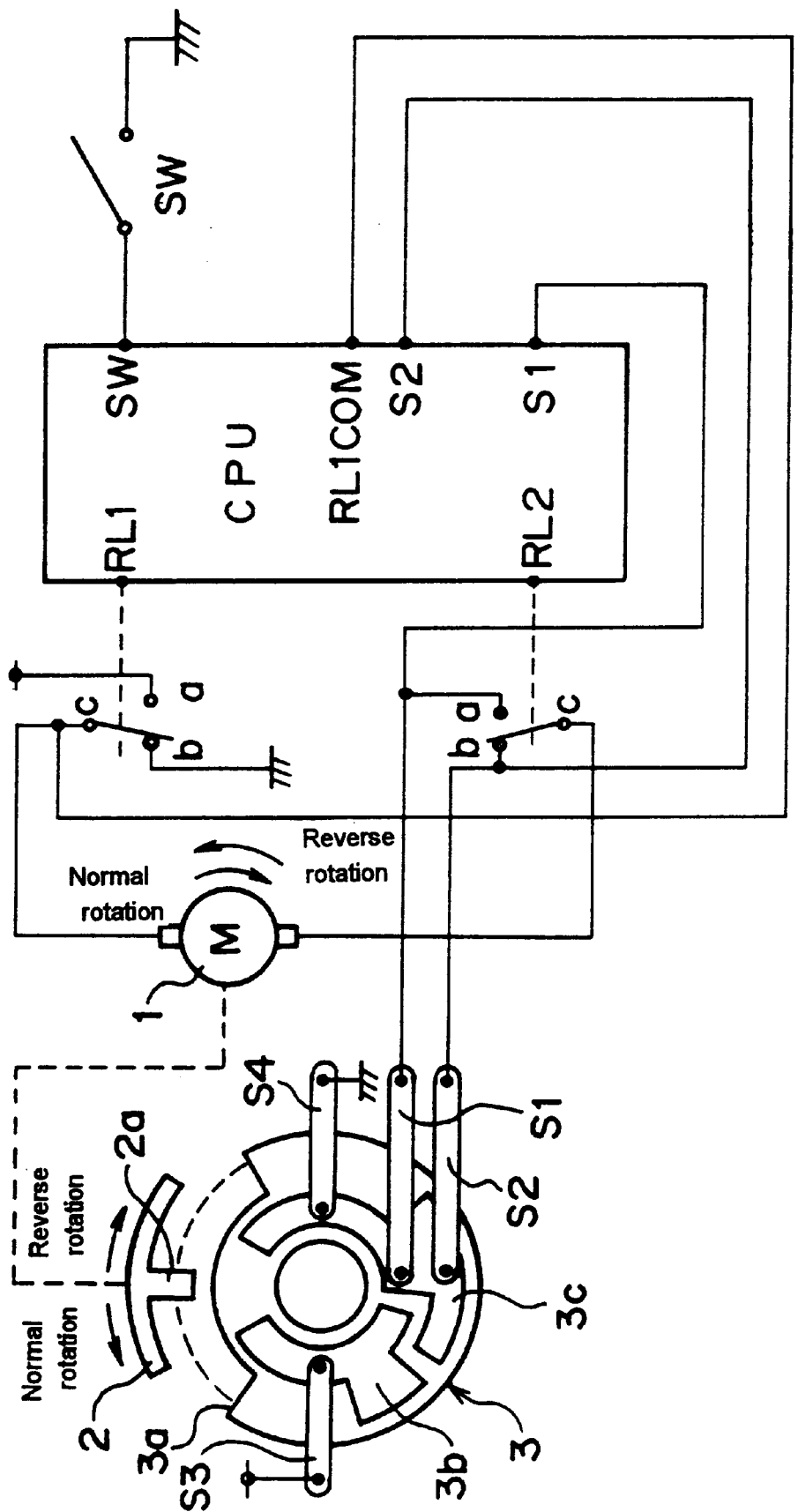
FIG. 11 is a circuit diagram showing a main part of a wiper apparatus as Embodiment 2 of the present invention.
Figure 12:
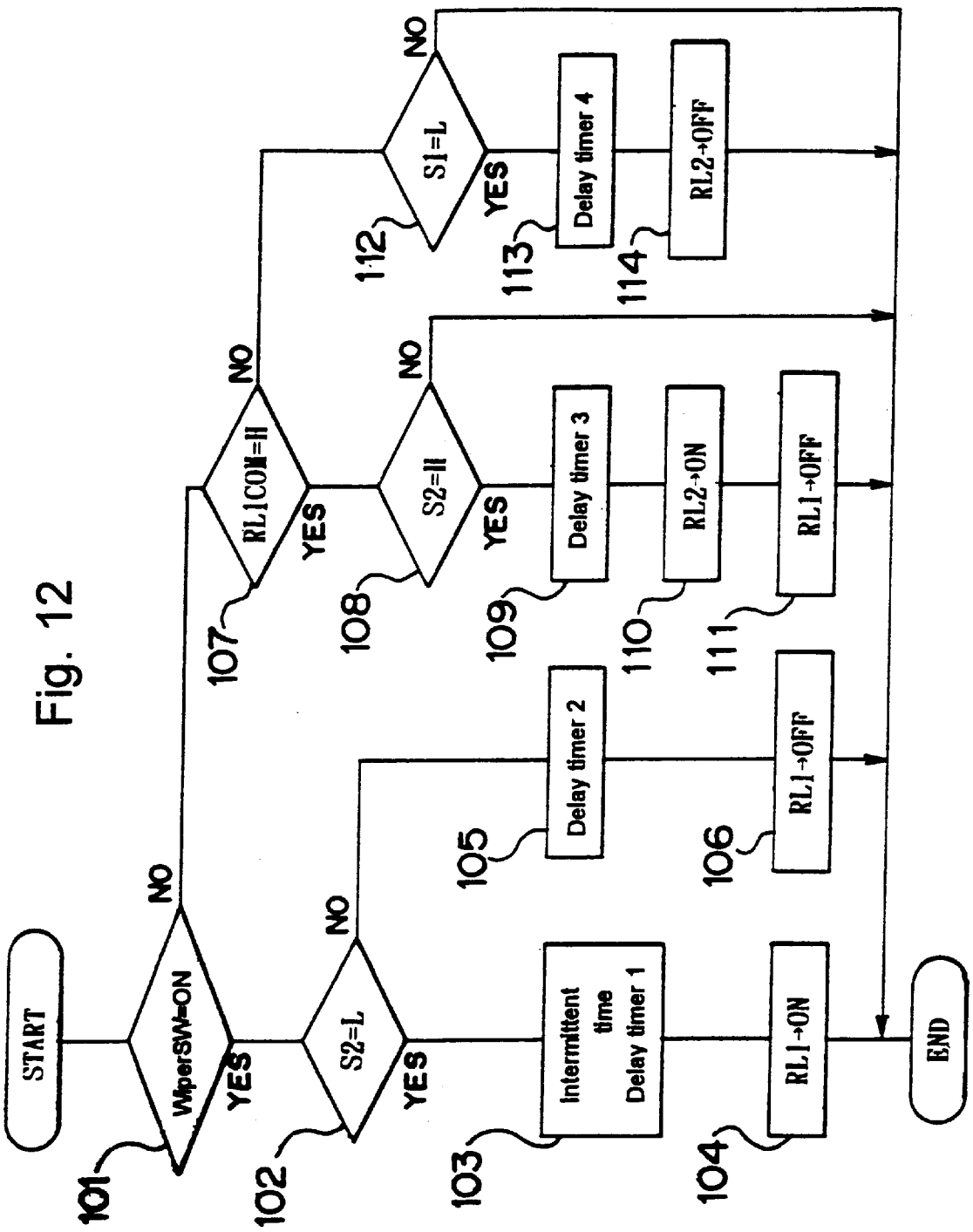
FIG. 12 is a flowchart showing a control procedure for micro computer used in the wiper apparatus of Embodiment 2 of the present invention.

Embodiment 2:

FIG. 11 is a circuit diagram showing a main part of a wiper apparatus as Embodiment 2 of the present invention; and FIG. 12 is a flowchart showing a control procedure for micro computer used in the wiper apparatus of Embodiment 2 of the present invention.

Similarly to the above-described Embodiment 1, the wiper apparatus of the present Embodiment 2 is used in a rear wiper of the direct drive system in which a wiper blade of a vehicle such as an automobile performs reciprocating wiping operation by normal and reverse rotation of a motor. The present wiper apparatus comprises a motor 1, a worm wheel 2, a relay plate 3, contacts S1–S4, and the like. It is different from Embodiment 1 in that the control circuit comprises a microcomputer CPU, so as to switch a current flow direction for the motor 1, similarly depending on contacting conditions between the relay plate and the first through fourth contacts S1–S4.

Namely, as shown in FIG. 11 for example, the control circuit of the wiper apparatus in the present Embodiment 2 comprises a microcomputer CPU which can be controlled by a software program and is connected between a wiper switch SW, contacts S1, S2, and COM of a relay RL1 for supplying input signals, and relays RL1, RL2 operated by output signals of the microcomputer CPU.

This microcomputer CPU receives, as inputs, a state signal of the wiper switch, respective position-detecting signals of storing, lower turning, and upper turning based on contacting condition between the relay plate 3 and the first and second contacts S1, S2, and COM signal of the relay RL1. The microcomputer CPU outputs output signals for controlling the relays RL1, RL2 so as to make the motor 1 rotate in the normal or reverse direction. In addition, the microcomputer CPU can form a closed circuit to perform operation control such as electric braking, and stopping.

Here, the control procedure for the microcomputer will be described referring to the flowchart of FIG. 12.

In the case that the wiper switch SW is ON (Step 101) and the second contact S2 is "L" (Step 102), a delay timer 1 produces a delay (intermittent time) (Step 103), to turn the relay RL1 ON (Step 104). In Step 102, in the case that the second contact S2 is not "L", the delay timer 2 produces a delay (Step 105), to turn the relay RL1 OFF (Step 106).

On the other hand, in Step 101, if the wiper switch SW is not ON; COM signal of the relay RL1 is "H" (Step 107); and the second contact S2 is "H" (Step 108), then a delay timer 3 produces a delay (Step 109), to turn the relay RL2 ON (Step 110). Thereafter, the relay RL1 is turned OFF (Step 111).

Further, in Step 107, if COM signal of the relay RL1 is not "H" and the first contact S1 is "L" (Step 112), then a delay timer 4 produce a delay (Step 113), to turn the relay RL2 OFF (Step 114).

As described above, ON/OFF of the relays RL1, RL2 can be controlled, using ON/OFF of the wiper switch SW, "H"/"L" based on the contacting condition of the first and second contacts S1, S2, and "H"/"L" of COM signal of the relay RL1. In similar timing to the above-described Embodiment 1, this ON/OFF control of the relays RL1, RL2 can perform the intermittent operation of the wiper blade by turning the wiper switch SW ON, the storing operation of the wiper blade by turning the wiper switch SW OFF, and the operation of the wiper blade at the time of turning the wiper switch SW OFF immediately after turning ON.

Accordingly, the wiper apparatus of the present Embodiment 2 has effects similar to the above-described Embodiment 1. Namely, braking can be started without delay, and accuracy of the turning positions can be improved. Further, malfunction of the wiper blade can be prevented, and in addition, the wiper blade can be reliably operated to the storing position, without stopping in the range of the reciprocating wiping operation. Further, the motor 1 and the wiper blade can be operated in a stable manner.

In particular, use of a microcomputer CPU makes it easy to cope with, for example, conditional change in the relation between the output signals and the input signals, by changing a program.

Further, in such a wiper apparatus as the present embodiment, there may be considered a case that it does not have the first contact S1 for rise-up, while comprising the contacts S2–S4 and the relay plate 3. Or, the microcomputer CPU may neglect the position-detecting signal of the first contact S1. In those cases, there is obtained a normal-reverse-rotating direct-drive-type wiper apparatus which does not have a rise-up function at the storing position and performs reciprocating wiping operation at the turning positions.

Figure 13:
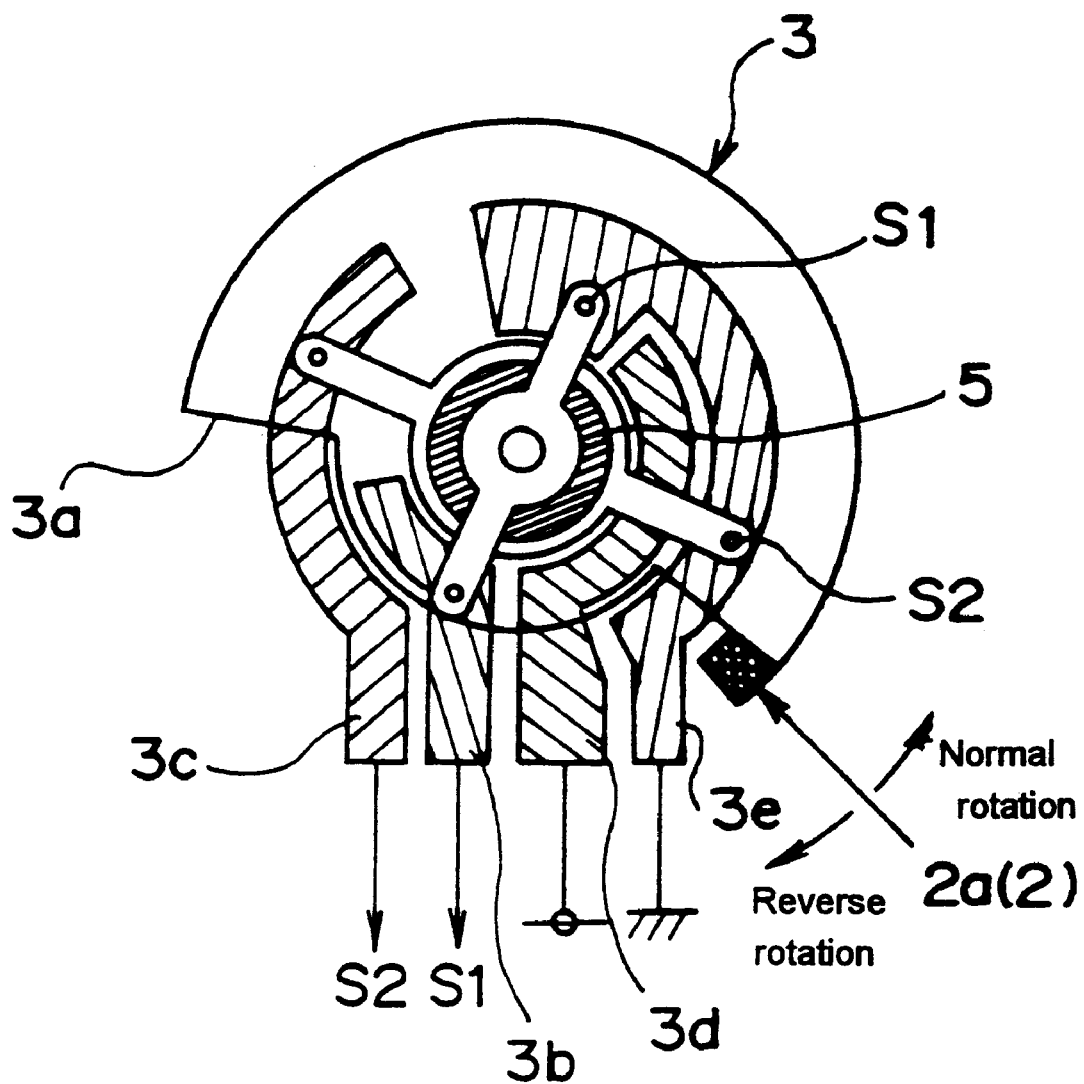
FIG. 13 is a block diagram showing a main part of a wiper apparatus as Embodiment 3 of the present invention.

Embodiment 3:

FIG. 13 is a block diagram showing a main part of a wiper apparatus as Embodiment 3 of the present invention.

Similarly to the above-described Embodiments 1 and 2, the present wiper apparatus is used in a rear wiper of the direct drive system in which a wiper blade of a vehicle such as an automobile performs reciprocating wiping operation by normal and reverse rotation of a motor. The present wiper apparatus comprises a motor 1, a worm wheel 2, a relay plate 3, contacts S1–S2, and the like. It is different from Embodiments 1 and 2 in that construction of the relay plate 3 and the contacts S1, S2 are changed, so that current direction in the motor 1 is to be switched based on contacting condition between the relay plate 3 and the contacts S1, S2.

Namely, as shown in FIG. 13 for example, the present Embodiment 3 is contrary to the above-described Embodiments 1, 2 in that the relay plate 3, which has first through fourth conductive material portions 3b–3e, is fixed, while the contacts S1, S2 are rotated. The first contacts S1 for rise-up and the second contact S2 for normal-reverse rotation are in contact with the first through fourth conductive material portions 3b–3e, and rotated being interlocked with movement of a boss 2a fixed to the worm wheel 2.

The first through fourth conductive material portions 3b–3e of the relay plate 3 are insulated from one another. The first and second conductive material portions 3b, 3c provide signals, which become input signals to the control circuit 4. Further, the third conductive material portion 3d and the fourth conductive material portion 3e are connected with the power-supply voltage and the grounding voltage, respectively. An insulating plate 5 is placed between the first contact S1 and the second contact S2.

In thus-described construction, also, current direction in the motor 1 can be switched based on the state signal of the wiper switch SW, the position-detecting signals obtained from the contacting condition between the relay plate 3 and the contacts S1, S2, and COM signal of the relay RL1. By switching the current direction, the motor 1 can be controlled to be in a normal rotating state, a reverse rotating state, a stopped state by electric braking, so as to perform the intermittent operation and storing operation of the wiper blade, and operation of the wiper blade at the time when the wiper switch SW is turned OFF immediately after being turned ON, similarly to the above-described Embodiments 1, 2.

Thus, effects of the wiper apparatus of the present Embodiment 3 is similar to the above-described Embodiments 1, 2. Namely, at the turning positions in the reciprocating wiping operation of the wiper blade, braking can be started without delay, and accuracy of the turning positions can be improved. Further, malfunction of the wiper blade can be prevented, and in addition, the wiper blade can be reliably operated to the storing position, without stopping in the range of the reciprocating wiping operation. Further, the motor 1 and the wiper blade can be operated in a stable manner.

In particular, by fixing the relay plate 3, while rotating the first and second contacts S1, S2, it is possible to have variations in the interlocking relation of the boss 2a with the relay plate 3 and the first and second contacts S1, S2.

Thus, the invention made by the present inventor has been described in detail based on Embodiments 1–3. However, the present invention is not limited to these embodiments, and can be variously changed without departing from the scope of the invention.

For example, shapes of the relay plate 3 and of the conductive material portions provided in this relay plate 3, circuit configuration of the control circuit 4, and the like are not limited to the above embodiments, and can be changed variously. Further, the present invention can be applied to a case that polarity of the current-carrying circuit for the motor 1 is reversed.

The above description has been given for the case that the invention by the present inventor is applied to a rear wiper used in a vehicle such as an automobile, as its technical field. However, the present invention is not limited to this application, and can be widely applied to other wipers of direct drive type, and further to whole wiper apparatuses of other vehicles such as a train.

Effects of the representative inventions among the herein-disclosed inventions will be briefly described as follows.

(1) When the motor is to be stopped at the turning positions in the reciprocating wiping operation of the wiper blade, electric braking is made to act directly on the motor according to the contacting condition between the relay plate and the contacts. As a result, braking can be started without delay, and accuracy of the turning positions can be improved.

(2) Even if a relay behaves incorrectly, the motor is only stopped and does not continue rotating in the normal or reverse direction at a turning position. Accordingly, it is possible to prevent such malfunction of the wiper blade as contacting with a pillar.

(3) The apparatus holds the rotation of the motor by itself. Thus, even if the wiper switch is turned OFF immediately after being turned ON, the motor can continue its rotation. Accordingly, the wiper blade is not stopped within the range of the reciprocating wiping operation, and can be operated so as to arrive at the storing position certainly.

(4) When the wiper blade is to be rotated in reverse, normal rotation is switched to the reverse rotation or vice versa after electric braking once attains a stopped state. Accordingly, a load within a given range can be applied to the contacts and the motor, so that the motor and the wiper blade can be operated in a stable manner.

(5) In particular, in the normal-reverse-rotating direct-drive system, it is possible to provide such a wiper apparatus in which switching of the contacts or the motor does not cause unnecessary load. Further, accuracy of the turning positions can be improved by using electric braking brought about by the relay plate interlocked with the driving of the motor, and malfunction of the wiper blade can be prevented.

(6) In particular, there is provided a means for switching a wiping angle, that means being arranged so as to enlarge the operating angle of the wiper blade than the ordinary case, depending on ON/OFF state of the wiper switch. By this, it is possible to provide a rise-up type wiper apparatus.

(7) In particular, each of the conductive material portions are provided, integrally and at a given angle, with an extended conductive material portion which extends in the circumferential direction passing an end portion for switching polarity. Thus, it is possible to provide a wiper apparatus which can vary rise-up distance by this angle of the extended conductive material portion.

(8) In particular, there is provided a means for holding rotational direction of the motor in accordance with the state of the switching means. By this, it is possible to provide a wiper apparatus that holds an ON state of the switching means in accordance with the state of the switching means, not to stop incorrectly even if the wiper switch is turned OFF immediately after being turned ON.

(9) In particular, a plurality of contacts may be rotated, being interlocked with the normal and reverse rotation of the motor, while the relay plate is fixed. By this, it is possible to provide a wiper apparatus that can have variation in interlocking relation between the relay plate-contacts and the boss fixed to the worm wheel.

(10) In particular, a microcomputer may be employed as the control circuit that receives position detecting signals or the like based on the contacting condition between the relay plate and a plurality of contacts, outputs output signals for controlling the switching means so as to rotate the motor in the normal or reverse direction, and performs operation control of electric braking and stopping. By this, it is possible to provide a wiper apparatus that can easily cope with, for example, conditional change in the relation between the output signals and the input signals, by changing a program.

I claim:

1. A direct drive type wiper apparatus, in which normal and reverse rotations of a motor cause reciprocating wiping operation of a wiper blade between two normal turning positions of the blade, said apparatus comprising:

a motor which rotates in normal and reverse directions;

a switching means for switching said motor between the normal direction of rotation and the reverse direction of rotation;

a relay plate and a plurality of contacts contacting the relay plate at contacting positions on the relay plate, and which contacting positions on the relay plate are changed in response to the normal and reverse rotations of said motor when said wiper blade reaches each of said normal turning positions in the reciprocating wiping operation of said wiper blade;

said relay plate having a plurality of conductive material portions connected to different voltages respectively;

one of said plurality of contacts being a motor rotation contact;

said conductive material portions being so shaped and arranged on said relay plate that at each of said turning positions said motor rotation contact is moved from one of said conductive material portions of the relay plate to another conductive material portion of said relay plate to thereby change the voltage applied by a conductive material portion to the motor rotation contact; and means connected with said motor rotation contact and responsive to the change of voltage applied thereto at each of said turning positions to first apply electric braking to the motor and to then cause said switching means to switch said motor rotation to the normal or reverse direction opposite to its immediately preceding direction.

2. A direct drive type wiper apparatus according to claim 1, further comprising:

an ON/OFF switch for turning ON and OFF electrical power to the apparatus; and a means responsive to the operation of said ON/OFF switch for enlarging the wiping range of the wiper blade at one of said turning points.

3. A direct drive type wiper apparatus according to claim 2, wherein:

said means for enlarging the wiping range includes at least one of the conductive material portions having an extended portion of a given angular extent which extends in a circumferential direction past an end of another portion of the same conductive material portion which moves into or out of engagement with said motor rotation contact at each of said normal turning points of said wiper blade.

4. A direct drive type wiper apparatus according to claim 1, further comprising:

a means for holding a rotational direction of said motor, depending on a state of said switching means.

5. A direct drive type wiper apparatus according to claim 1, wherein:

said relay plate is rotated at said turning positions of the wiper blade in response to the normal and reverse rotation of said motor; and said plurality of contacts are fixed.

6. A direct drive type wiper apparatus according to claim 1, wherein:

said plurality of contacts are rotated at said turning positions of the wiper blade in response to the normal and reverse rotation of said motor; and said relay plate is fixed.

7. A direct drive type wiper apparatus according to claim 1, wherein:

said means connected to said motor rotation contact includes a control circuit which receives as inputs, respective position signals indicating respectively a wiper blade stored position, a wiper blade lower turning position, and a wiper blade upper turning position based on the contacting condition of said relay plate with said plurality of contacts, and a signal from said switching means indicating the state of said switching means, which control circuit outputs output signals for controlling said switching means so as to rotate said motor in the normal or reverse directions, and which control circuit performs the electric braking of the motor by forming a closed circuit through the motor.

8. A direct drive type wiper apparatus according to claim 7, wherein:

said control circuit comprises a combination of logic gates.

9. A direct drive type wiper apparatus according to claim 7, wherein:

said control circuit comprises a microcomputer.

10. A direct drive type wiper apparatus, in which reciprocating wiping motion of a wiper blade is achieved in response to normal and reverse rotations of a motor, comprising:

a motor which rotates in normal and reverse directions;

a control circuit for switching the direction of electrical current supplied to said motor so as to switch the rotational direction of said motor between said normal and reverse directions;

a relay plate having a plurality of conductive material portions connected to different voltages respectively; and a plurality of contacts contacting with said conductive material portions respectively; wherein:

said control circuit produces a signal to hold a given direction of rotation of said motor during movement of said wiper blade between two turning points of its reciprocating wiping motion;

contacting positions between said conductive material portions and said contacts are relatively changed in response to the normal and reverse rotations of said motor so as to provide signals on the contacts indicating the wiper blade being at turning positions in the reciprocating wiping motion of the wiper blade;

said contacts comprising a first contact for changing the wiping range of said wiper blade and a second contact for changing the rotation of said motor between said normal and reverse directions;

said conductive material portions include a first conductive material portion and a second conductive material portion, and the position of said second contact relative to the relay plate is changed at the turning positions of said wiper blade so as to move from one of said conductive material portions to another to change the voltage applied to said second contact; and means responsive to said change in the voltage applied to said second contact for first electrically braking the motor and then changing the direction of rotation of the motor.

* * * * *